(12) United States Patent
Lizarraga Senar

(10) Patent No.: US 11,592,073 B2
(45) Date of Patent: Feb. 28, 2023

(54) VARIABLE LOAD HYDRAULIC CONTROL DEVICE

(71) Applicant: Kyb Europe GmbH, Sucursal En Navarra, Ororbia (ES)

(72) Inventor: Javier Lizarraga Senar, Pamplona (ES)

(73) Assignee: Kyb Europe GmbH, Sucursal En Navarra, Ororbia (ES)

( * ) Notice: Subject to any disclaimer, the term of this patent is extended or adjusted under 35 U.S.C. 154(b) by 169 days.

(21) Appl. No.: 17/117,495

(22) Filed: Dec. 10, 2020

(65) Prior Publication Data

US 2021/0180662 A1 Jun. 17, 2021

(30) Foreign Application Priority Data

Dec. 11, 2019 (ES) ................................ ES201931098

(51) Int. Cl.
| | | |
|---|---|---|
| *F16F 9/48* | (2006.01) | |
| *F16F 9/49* | (2006.01) | |
| *B60G 17/056* | (2006.01) | |
| *F16F 9/19* | (2006.01) | |
| *F16F 9/32* | (2006.01) | |
| *F16F 9/34* | (2006.01) | |

(52) U.S. Cl.
CPC .............. *F16F 9/49* (2013.01); *B60G 17/056* (2013.01); *F16F 9/19* (2013.01); *F16F 9/3235* (2013.01); *F16F 9/34* (2013.01); *B60G 2202/24* (2013.01); *B60G 2204/45* (2013.01)

(58) Field of Classification Search
CPC ........ F16F 9/34; F16F 9/48; F16F 9/49; F16F 9/346; F16F 9/348; F16F 9/512; F16F 9/19; F16F 9/3235; B60G 17/056; B60G 2202/24; B60G 2204/45
USPC ................................ 188/284, 286, 287, 315
See application file for complete search history.

(56) References Cited

U.S. PATENT DOCUMENTS

| | | | |
|---|---|---|---|
| 9,091,320 B1 * | 7/2015 | Smith | ........................ F16F 9/48 |
| 9,982,738 B2 * | 5/2018 | Lizarraga Senar | ... F16F 13/007 |
| 2016/0025174 A1 | 1/2016 | Lizarraga Senar | |

FOREIGN PATENT DOCUMENTS

| | | | | |
|---|---|---|---|---|
| EP | 1477343 A2 * | 11/2004 | ......... | B60G 17/0272 |
| EP | 3717792 A1 * | 10/2020 | ................ | F16F 9/49 |
| ES | 2561132 A1 | 2/2016 | | |

\* cited by examiner

*Primary Examiner* — Christopher P Schwartz
(74) *Attorney, Agent, or Firm* — The Webb Law Firm

(57) ABSTRACT

The present invention relates to a variable load hydraulic control device comprising an inner tube able to be coupled to an upper tubular head to form an internal chamber and an external chamber, in addition to an inner casing, a floating piston, able to slide between the inner tube and the inner casing, a retaining ring, an upper spring, located between the floating piston and an extension of a washer located inside the upper tubular head, a lower spring, located between the floating piston and an extension of the inner casing, a control surface, a leak opening to communicate the external chamber and the internal chamber, wherein the static load of the hydraulic control device determines the position of the floating piston and the section of passage through the leak opening.

9 Claims, 14 Drawing Sheets

VARIABLE LOAD HYDRAULIC CONTROL DEVICE

CROSS-REFERENCE TO RELATED APPLICATIONS

This application claims priority to Spanish Patent Application No. P201931098 filed Dec. 11, 2019, the disclosure of which is hereby incorporated by reference in its entirety.

BACKGROUND OF THE INVENTION

Field of the Invention

The present invention relates to a variable load hydraulic control device the configuration and design of which enable it to be adapted and adjusted depending on the load situation of the vehicle wherein it is incorporated.

Description of Related Art

The present invention is an improvement of the Spanish patent called "Hydraulic Compression Stop" with publication number ES-2561132_B1. This mechanism is known by its English acronym, HCS (Hydraulic Compression Stop).

The hydraulic compression stop (HCS) of Spanish patent ES-2561132_B1 consists of a device that comprises a piston, attached to a rod, which slides inside a tubular casing and separates a first upper area, or traction chamber, from a second lower area, or compression chamber.

In the compression chamber, the device comprises an inner tube along which an externally guided upper tubular head slides, which comprises a series of longitudinal through slots and which closes the inner tube at the upper end thereof by sliding the upper tubular head on said inner tube.

Moreover, the inner tube includes an annular, or valve, support at the lower end, which has through holes that are located on the outside of the inner tube.

In this way, the inner tube, together with the upper tubular head and the annular support, divide the compression chamber into two chambers: an internal chamber, inside the inner tube and the upper tubular head and delimited by the internal surfaces of the upper tubular head and the inner tube, and an external chamber, outside the inner tube and upper tubular head and delimited by the internal surface of the tubular casing and the external surfaces of the upper tubular head and the inner tube.

The external chamber and the internal chamber are connected by means of the through slots of the upper tubular head and by means of the through holes of the annular support.

In the compression movement, the upper tubular head moves downwards on the inner tube.

As it moves downwards, the slots of the upper tubular head close as the upper tubular head is introduced into the inner tube, until they are completely closed. In this situation, the fluid can only flow from the external chamber to the internal chamber through the through holes of the annular support.

With this patent, a compression stop the load of which is variable is achieved. With it, the problems arising from the abrupt operation of the devices with compression stops existing in the state of the art are prevented, such as a lack of comfort, excessive noise, deterioration due to repetitive use, among others.

By means of the through slots and holes it is possible to control the load and to establish the load level in the operation of the hydraulic device.

The slots provide continuous and progressive load control, preventing the aforementioned roughness, as the slots close during the compression movement (or open during the extension movement) when sliding on the inner tube, until the slots are completely closed (or open in the extension movement) by the inner tube.

Once the slots are completely closed by the inner tube, the through holes of the annular support are the only communication path between the internal and external chambers.

The through holes are able to control the load of the hydraulic compression stop and therefore the shock absorber load and, since they are independent from the rest of the components of the shock absorber, they can be configured to supply the desired load level.

Therefore, the progressiveness of the load is obtained by closing (opening) the through slots during the compression (extension) movement, while the load level is obtained by means of the configuration of the through holes.

The ability for fluid to flow through both the through slots and the through holes at the same time provides a smooth load transition during the shock absorber stroke.

However, the variable load control device of the invention described in this patent does not take into account the situation of the vehicle in case it is loaded or unloaded.

Indeed, if the vehicle is loaded in a static situation, the shock absorber would be in an initial position in which a portion of the compression stroke is already carried out. This implies that the slots would already be partially closed.

Therefore, in this situation, in the event of a possible dynamic compression movement such as when the vehicle is circulating and encounters a speed bump, the comfort effect would be reduced, producing peak forces.

The present invention solves this problem, making it possible to distinguish the situation of the vehicle in terms of load situation.

SUMMARY OF THE INVENTION

In order to achieve the aforementioned objectives and prevent the aforementioned drawbacks, the present invention describes a variable load hydraulic control device which comprises a piston, activated by means of a rod. The piston separates a traction chamber and a compression chamber and slides through a tubular casing. Fixed to the piston, there is an upper tubular head in the compression chamber which comprises a longitudinal channel, parallel to the axis of the tubular head and which reaches to the end, that is, it is open at least at one end. In the compression chamber there is also an inner tube which has an annular support at the lower end thereof. The annular support comprises a series of through holes. This creates, on the one hand, an external chamber defined by the exterior of the inner tube and of the upper tubular head and the tubular casing and, on the other hand, an internal chamber, defined by the interior of the inner tube and of the upper tubular head. The hydraulic communication between both chambers is carried out through the channel and through the through holes of the annular support and additional leak openings that are incorporated into the inner tube as will be described later.

In the device of the present invention an inner casing is housed, coaxial with the inner tube, to which it is fixed at one end, and leaving a space for housing a floating piston, also coaxial with the inner tube, which fits in this space created for sliding on the inner tube and also on the inner casing, by means of an inner projection that the floating piston incorporates.

Additionally, the device incorporates an upper spring and a lower spring, both coaxial with the inner tube, each one supported by one side of the projection of the floating piston.

The inner casing incorporates a retaining ring, at the free end, intended to secure a default compression of the lower spring.

The upper spring rests at the other end on an extension of a washer, located inside the upper tubular head and sufficiently guided by the inner surface of the upper tubular head so that the conical surface of the piston pin of the rod can enter and exit the inner hole of the washer during the operation of the shock absorber, so that it is compressed with the movement of the piston, forcing the floating piston to move.

Furthermore, the other end of the lower spring rests on an extension located in the inner casing.

Another essential feature is a control chamber, configured within the inner tube between the floating piston and the base of the inner casing where the lower spring rests. This chamber, like the rest of the compression chamber, is filled with fluid.

The floating piston is fitted with minimal clearance to both the inner casing and the inner tube, which enables it to slide on them. Now, this minimum clearance makes it difficult for the fluid to access and/or exit the control chamber.

Throughout this specification a differentiation will be made between static load and dynamic load.

Static load is understood as a load applied to the device of the invention in a constant way over time, such as, for example, luggage and passengers in a vehicle. While dynamic load is understood as a load applied to the device of the invention for a very short period of time, such as, for example, passing over a speed bump.

Thus, when the device of the invention is subjected to a static load, this load being constant over time enables the floating piston to move slowly, as the fluid has enough time to enter or exit the control chamber through the existing minimum clearance, until it reaches the equilibrium position thereof defined by the forces exerted by the upper and lower springs depending on the static load to which the device of the invention is subjected.

However, when the device is subjected to a dynamic load, as this load is applied for a very short period of time, it does not provide the time for the fluid to leave the control chamber and therefore the position of the floating piston is not significantly modified.

For this reason, the control chamber provides the device with memory, maintaining the position of the floating piston, established by the static load to which the vehicle is subjected, without influencing subsequent dynamic loads.

Another essential feature of the device is a control surface that is created by way of recess of the outer surface of the inner tube and which comprises a variable leak opening for communication of the external chamber and the internal chamber.

The position of the floating piston is determined by the static load of the hydraulic control device for which the operation is configured, and is regulated by the length and stiffness of the upper and lower springs. The position of the floating piston determines that the variable leak opening is fully closed, partially closed or open depending on the static load to which it is subjected.

In a preferred embodiment, the control surface has a variable depth with respect to the outer diameter of the inner tube which increases in the direction of the longitudinal axis of the inner tube until it reaches the variable leak opening. Moreover, it has a length such that it is covered by the upper tubular head during the compression stroke, that is, the upper tubular head, as it advances in the compression stroke, progressively closes the control surface and therefore the access to the variable leak opening, until it closes it completely.

In another preferred embodiment, the inner tube further incorporates a permanent leak opening in a position located close to the annular support which the upper tubular head does not reach during the compression movement, so that it cannot close it. Furthermore, the inner casing is attached to the inner tube by means of the valve support, so that the support extension for the lower spring is intended to be a support for the sliding of the floating piston. The inner casing further comprises through slots so that the fluid can flow through the internal chamber.

In another preferred embodiment, the control surface has a constant depth with respect to the outer diameter of the inner tube and a length such that it is not covered by the upper tubular head during the compression stroke, that is, it always protrudes, so that the fluid will always have access to the variable leak opening from the external chamber, although the passage to the internal chamber is not secured. To facilitate this step, the floating piston comprises a through opening in a position such that it faces the variable leak opening if the device is not subjected to any static load.

Additionally, the channel of the upper tubular head comprises a plurality of holes, aligned and centered on the channel.

In this way, the channel can be through, the channel of the upper tubular head being open at both ends, or it can also be closed at the end closest to the piston, that is, the channel is not a through channel, being closed at this end, which would mean that the flexibility of the upper tubular head increases as the distance to that end increases.

BRIEF DESCRIPTION OF THE DRAWINGS

To complete the description of the invention, and for the purpose of helping to make the features thereof more readily understandable, according to a preferred exemplary embodiment thereof, a set of drawings is included wherein, by way of illustration and not limitation, the following figures have been represented.

DETAILED DESCRIPTION OF THE INVENTION

Figure 1:
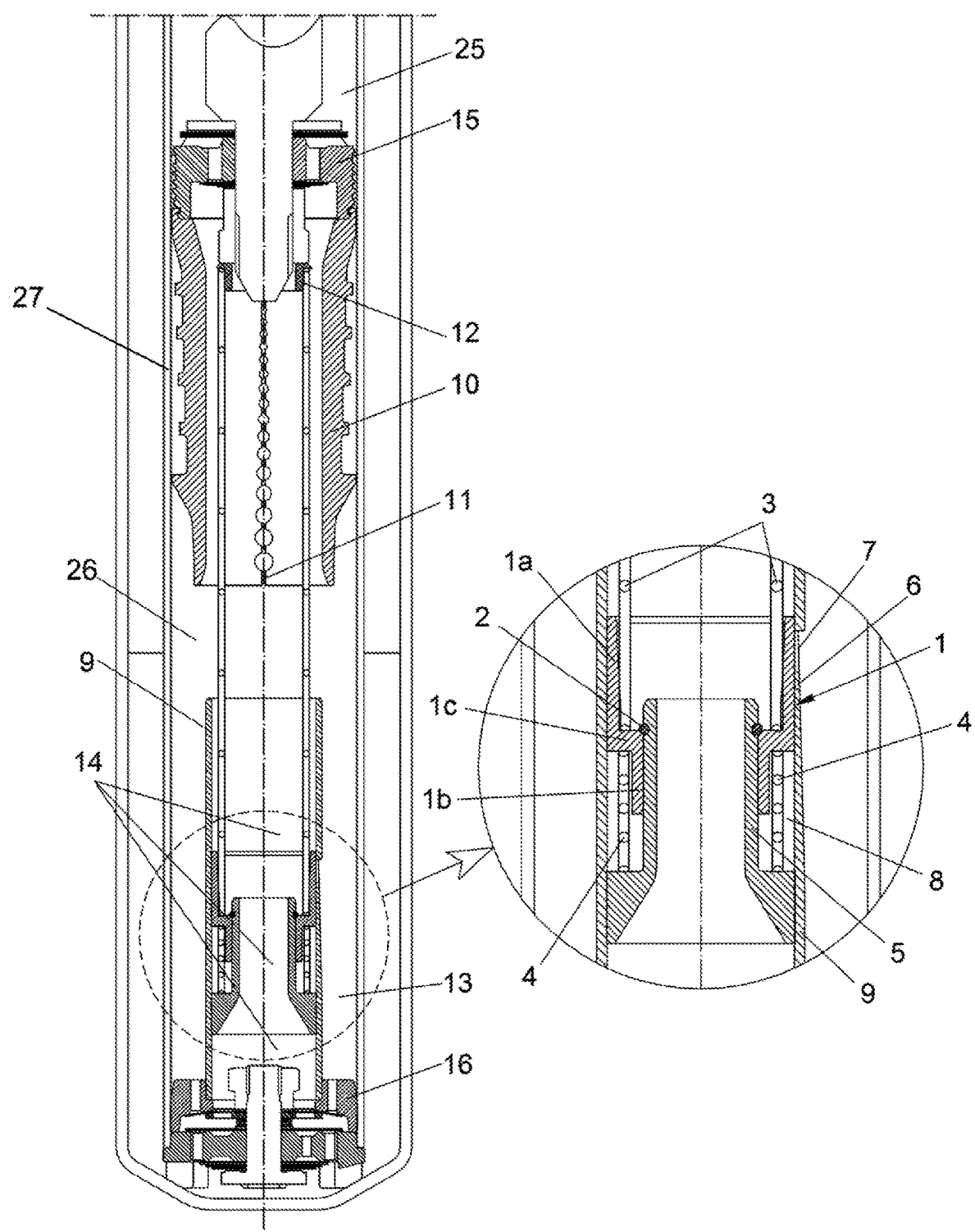
FIG. 1 represents the hydraulic device of the invention in a first embodiment for a vehicle unloaded and configured for hard mode, positioned at the beginning of the compression stroke, wherein the upper tubular head has not yet contacted the inner tube, along with an enlargement to more accurately show the main internal components.
Figure 2:
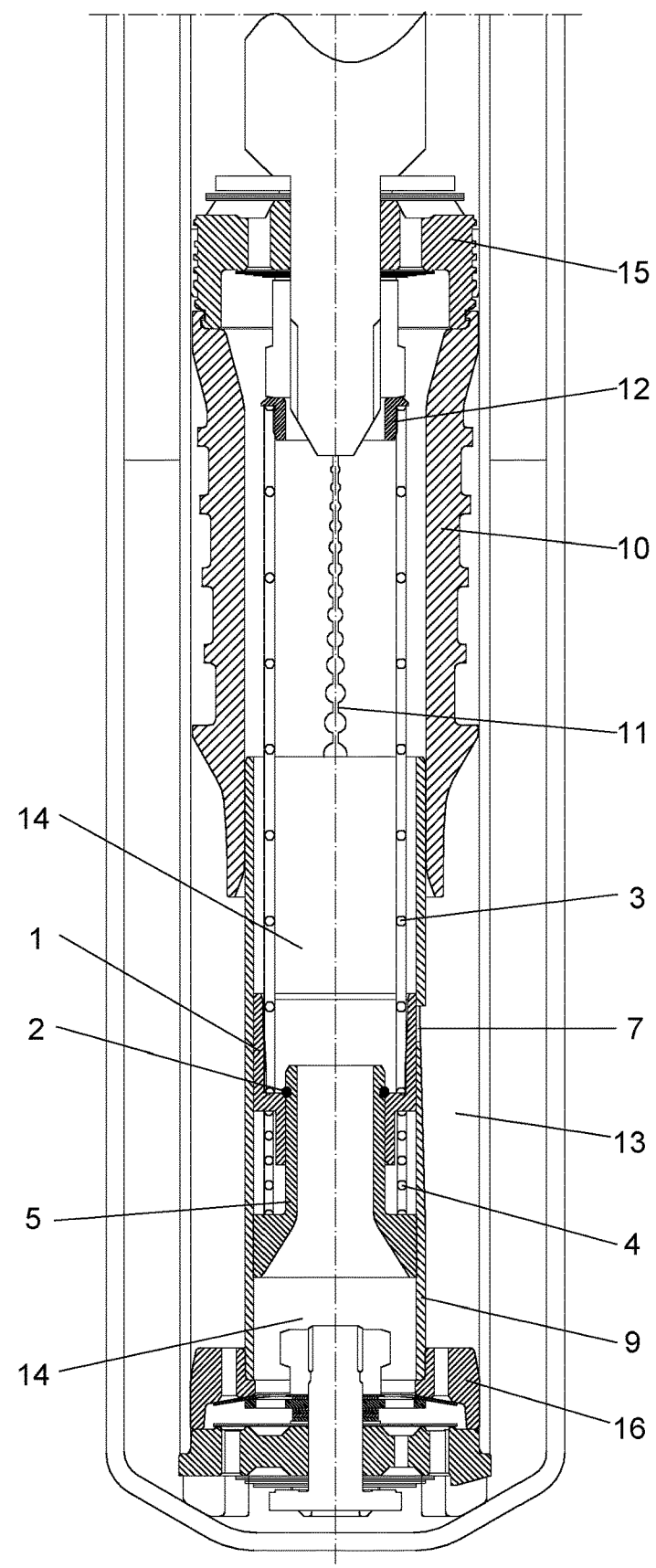
FIG. 2 represents the hydraulic device of FIG. 1 for a vehicle unloaded and configured for hard mode, positioned in an intermediate area of the compression stroke, wherein the upper tubular head has already contacted the inner tube, operating according to a HCS system as the one already known.
Figure 3:
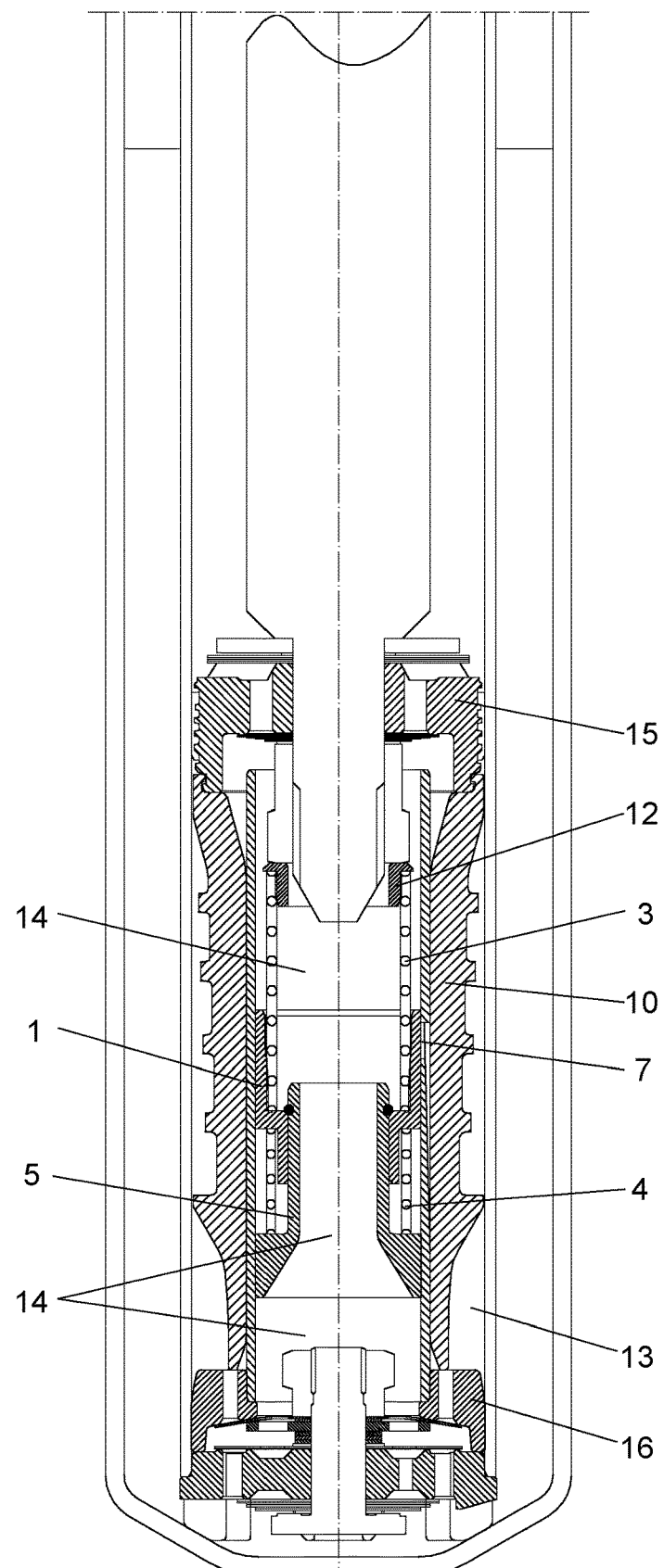
FIG. 3 represents the hydraulic device of FIG. 1 for a vehicle unloaded and configured for hard mode, positioned at the end of the compression stroke, operating according to a HCS system such as the one already known.
Figure 4:
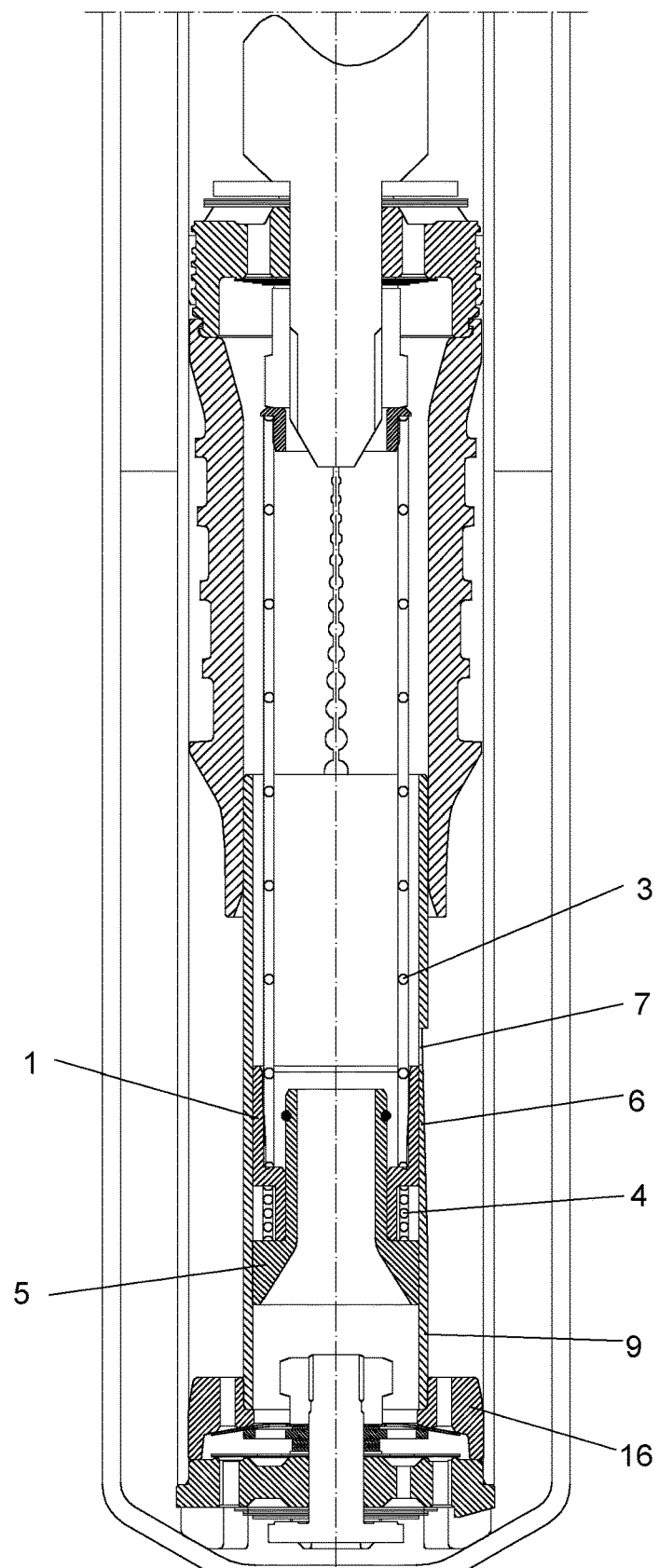
FIG. 4 represents the hydraulic device of FIG. 1 for a vehicle loaded and configured for soft mode, positioned at the beginning of the compression stroke, with the variable leak opening of the inner tube fully open.
Figure 5:
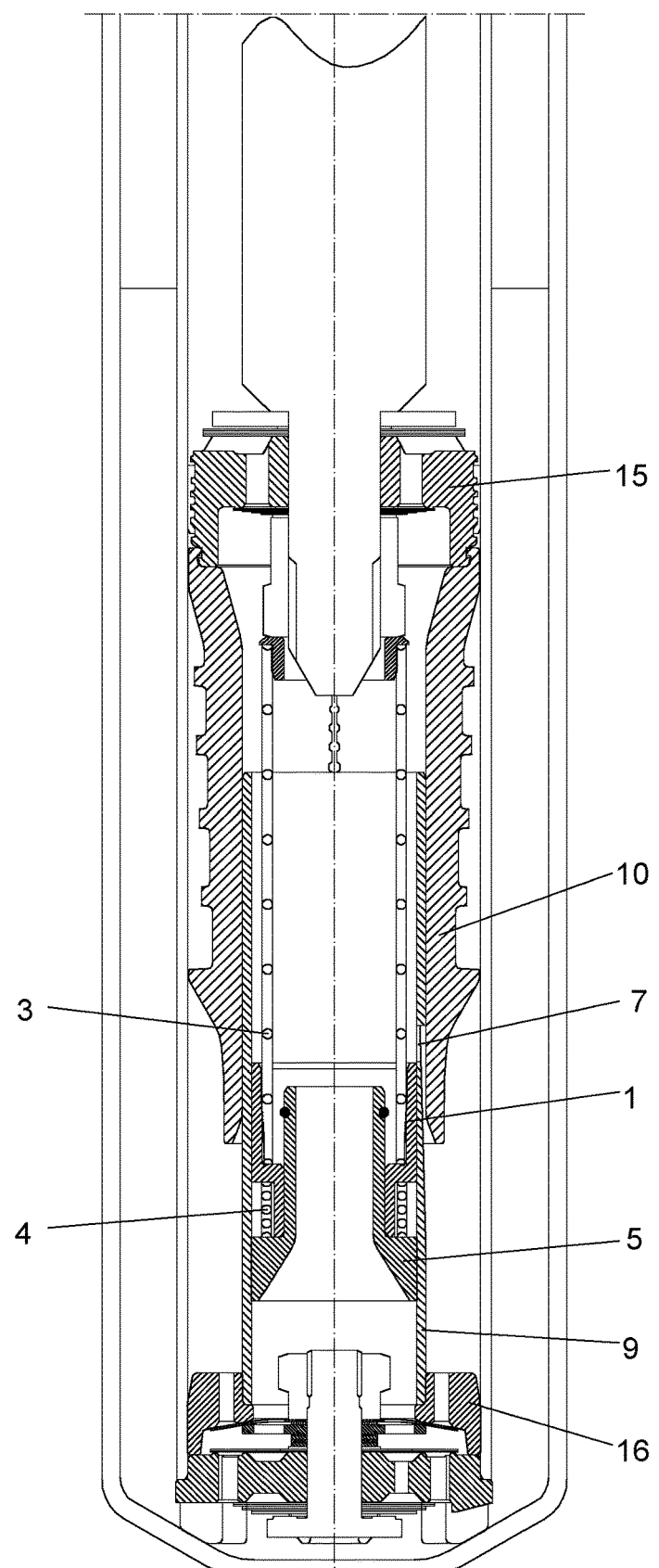
FIG. 5 represents the hydraulic device of FIG. 1 for a vehicle loaded and configured for soft mode, positioned in an intermediate area of the compression stroke, with the variable leak opening partially closed by the upper tubular head.

The present invention relates to a variable load hydraulic control device that is adjusted depending on the static load of the vehicle wherein it is incorporated.

The invention describes a variable load hydraulic control device which comprises a piston (15), activated by means of a rod. The piston (15) separates a traction chamber (25) and a compression chamber (26) and slides through a tubular casing (27).

Starting from the operating mode of the HCS system of the state of the art that has been described, in the present invention the upper tubular head (10) has a single channel (11) of a certain thickness, open at least at one of the ends thereof, which incorporates a series of holes, preferably circular, aligned and centered on the channel (11). This configuration enables the upper tubular head (10) to have a variable flexibility that increases until the open end.

In the compression movement, the upper tubular head (10) moves along the inner tube (9), and causes the channel (11) to close as the inner tube (9) is introduced into the upper tubular head (10). During this movement, the fluid is trapped inside the external chamber (13) except for the holes in the channel (11) of the upper tubular head (10) and the holes of the annular support (16), this causes the pressure in the external chamber (13) to be higher than the pressure in the internal chamber (14), which generates a flow of the fluid towards the interior of the internal chamber (14). Furthermore, as the compression movement continues, the inner tube (9) closes the channel (11) and the holes that favor the passage of the fluid, increasing the shock absorber load.

When the compression movement ceases and the extension movement begins, the upper tubular head (10) tends to regain the initial position, moving in the opposite direction to that of compression on the inner tube (9) until it separates. In this situation, the pressure in the internal chamber (14) is higher than the pressure in the external chamber (13), so the flow of the fluid is reversed, flowing in the opposite direction, leaving the internal chamber (14) towards the external chamber (13). The difference in pressure applied to the upper tubular head (10), which has radial flexibility as it is partially or totally open by the channel (11), induces an increase in the internal diameter thereof. Said increase entails an increase in the clearance between the upper tubular head (10) and the inner tube (9), and a widening of the channel itself (11), which facilitates the entry of fluid to the external chamber (13). This minimizes the pressure necessary to fill the chamber (13) with fluid as it increases in volume, preventing the generation of load by the HCS in the extension stroke, as well as the occurrence of malfunctions such as cavitation.

The present invention maintains the advantages of the HCS system and improves it by optimizing the response of the system depending on the load condition of the vehicle, reducing peak forces and optimizing the use of the shock absorber load.

In a first embodiment, as represented in FIGS. 1 to 6, the inner tube (9) has a variable leak opening (7) through which the external chamber (13) communicates with the internal chamber (14).

If only the variable leak opening (7) existed, when the upper tubular head (10), in the compression movement, closed the variable leak opening (7), it would produce a peak force as a very abrupt change between soft and hard mode would occur.

The dimensions of the variable leak opening (7) are limited, since a raised section of the opening would not enable an adequate fitting of the function of the HCS and at the same time would force a very long stroke of the floating piston, which is not feasible due to lack of available space.

In order to obtain a correct progressiveness of the HCS function in soft mode, using the available space and without altering the section of the variable leak opening (7), the inner tube (9) is provided with a control surface (6).

The control surface (6) is defined by means of a recess made in an area of the outer surface of the inner tube (9).

The recess goes from more to less depth according to the longitudinal direction of the inner tube (9), from the leak opening (7), in the direction of advance of the compression stroke.

Thus, in FIGS. 1 to 6, the control surface (6) is represented as a reduction in the thickness of the wall of the inner tube (9) from a certain point until it reaches the leak opening (7).

The control surface (6) interposes a variable access restriction, during the compression stroke, to the fluid flowing through the variable leak opening (7). In this way, the gap between the control surface (6) and the upper tubular head (10) is reduced during the compression phase until, at the end of the compression stroke, the upper tubular head (10) is able to completely close the fluid access, from the external chamber (13) to the internal chamber (14) through the leak opening (7), by completely closing the control surface (6).

Therefore, the control surface (6) delimits a passage cross section that is progressively reduced as the system is compressed, providing a continuous transition area of the load that prevents peak loads and providing progressiveness to the modification of the HCS function that introduces the variable leak opening (7).

To configure the desired variable leak and continuous load transition, the following design parameters must be considered: position in the inner tube (9) of the variable leak opening (7), length of the control surface (6), geometric shape of the recess made in the outer surface of the inner tube (9) and the inclination and/or thickness of the recess.

Solidly attached to the internal surface of the inner tube (9), there is an inner casing (5) configured in the shape of a hollow cylinder, coaxial and leaving a space with the inner tube (9), which expands externally along the lower end forming a base, by means of which it is solidly attached to the inner tube (9), without the internal chamber (14) being divided.

A floating piston (1) is located between the inner tube (9) and the cylindrical shape of the inner casing (5) configured by a greater cylinder (1a) that extends internally by means of a projection (1c). The outer surface of the greater cylinder (1a) is fitted to the inner surface of the inner tube (9), enabling sliding between both of them with very little clearance. A smaller cylinder (1b), concentric with the larger cylinder (1a) extends from the projection (1c) to the opposite side. The inner surface of the smaller cylinder (1b) is fitted to the outer surface of the inner casing (5), also enabling sliding between both of them with very little clearance.

In this way, a control chamber (8) is created between the inner casing (5), the floating piston (1) and the inner tube (9).

A lower spring (4) is housed in the control chamber (8) coaxially with the floating piston (1) and the inner casing (5), located between the projection (1c) of the floating piston (1) and the base of the inner casing (5).

Furthermore, between the floating piston (1) and the inner casing (5) and, coaxially with them, an upper spring (3) is housed that rests at one end on the projection (1c) of the floating piston (1), and the other end of which is attached by interference to a projection that exhibits a washer (12) located inside the upper tubular head (10), such that the movement of the floating piston (1) is controlled on both sides of the projection (1c) by means of the two springs (3, 4).

The inner casing (5) comprises a retaining ring (2) located in proximity to the free end, opposite the base for attaching to the inner tube (9).

The function of the retaining ring (2) is to secure a default compression of the lower spring (4), which occurs when the floating piston (1) is in a position contacting the retaining ring (2).

In the situation wherein the vehicle is unloaded, no static load acts on the piston (15) and, therefore, it does not exert any force on the upper spring (3), causing the floating piston (1) to be in the upper position, closing the variable leak opening (7). In this situation, the device of the invention in the first embodiment thereof behaves operationally in the same way as the HCS device, both in compression and extension.

However, in the situation wherein the vehicle is loaded, the static load to which the piston (15) is subjected causes the upper spring (3) to compress and exert a force on the floating piston (1) which, by overcoming the force of the lower spring (4), manages to move it, partially or entirely opening the variable leak opening (7). Thus, the shock absorbing force is reduced, as will be detailed later.

It is convenient to remember that, when a vehicle is subjected to a static load, that is, a load applied for a long period of time, as for example by incorporating passengers or luggage, the only force acting on the floating piston (1) is that of the upper (3) and lower (4) springs, since the fluid has enough time in this situation to exit the control chamber (8).

However, with a dynamic load, being a load applied for a very short period of time, such as when the vehicle goes over a speed bump, the fluid exchange between the internal chamber (14) and the control chamber (8), which must be carried out through the small clearances between the walls, does not have enough time to complete properly, preventing the movement of the floating piston (1).

For this reason, the compressions that the device experiences due to dynamic loads do not vary the position of the floating piston (1), due to the opposition itself carried out by the fluid inside the control chamber (8).

Thus, as the control chamber (8) is filled with fluid, it provides memory to the device in such a way that, when a static load is applied, the device is positioned in the starting position thereof, partially or entirely opening the leak opening (7), without this position being altered if said static load is not modified.

Thus, the vehicle situation with a given static load is simply an initial configuration of the vehicle and the shock absorber situation. From this starting situation, the device will face the dynamic loads to which it is subjected, in such a way that, when there is a compression movement due to a dynamic load, the upper tubular head (10) will descend on the inner tube (9) closing, as it descends, the channel (11) with the holes thereof and being able to close the variable leak opening (7).

The incorporation into the inner tube (9) of the variable leak opening (7), in addition to the channel (11) of the upper tubular head (10), for the transmission of fluid between the external chamber (13) and the internal chamber (14) enables the shock absorber to go from having a hard-mode based operation to a soft-mode based operation, also passing through an intermediate-mode based operation, where the variable leak opening (7) is at an intermediate position, that is, neither entirely closed nor entirely open. This further enables the shock absorbing force to be reduced.

In this way it is achieved that during a portion of the compression movement, when the vehicle is loaded, the shock absorbing force is reduced compared to the unloaded vehicle situation, as the leak opening (7) is at least partially open. Hence the concept that the suspension is softened and that the operation follows a less hard mode.

However, when approaching the end of the compression stroke, when the leak opening (7) closes, the shock absorbing force is increased until it equals the shock absorbing force of the unloaded vehicle situation, hardening the mode that it follows and causing the suspension to be called a harder one.

Figure 12:
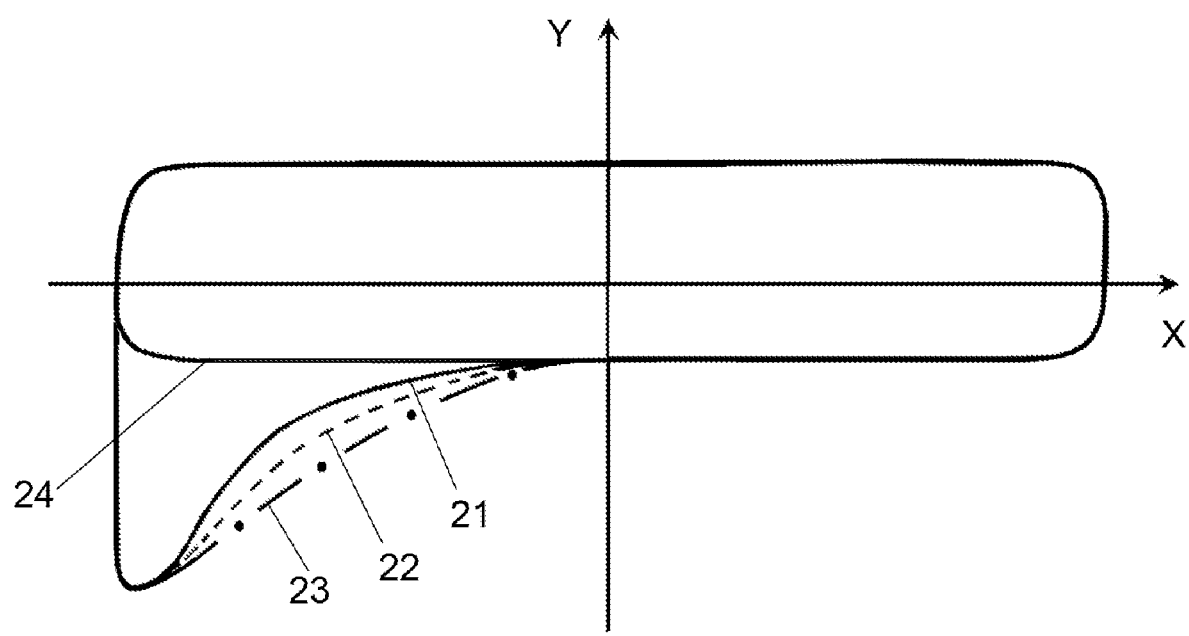
FIG. 12 represents a displacement force graph of the hydraulic device of the invention during a complete compression stroke according to the embodiment represented in FIGS. 1 to 6.
Figure 13:
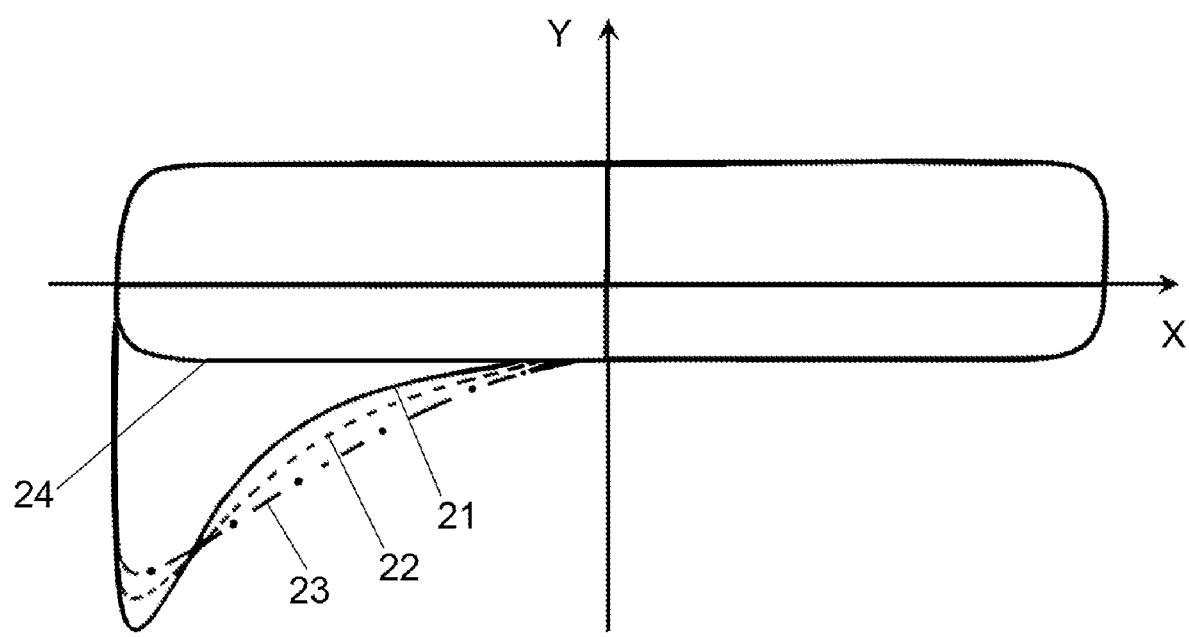
FIG. 13 represents a displacement force graph of the hydraulic device of the invention during a complete compression stroke according to the embodiment represented in FIGS. 7 and 8.
Figure 14:
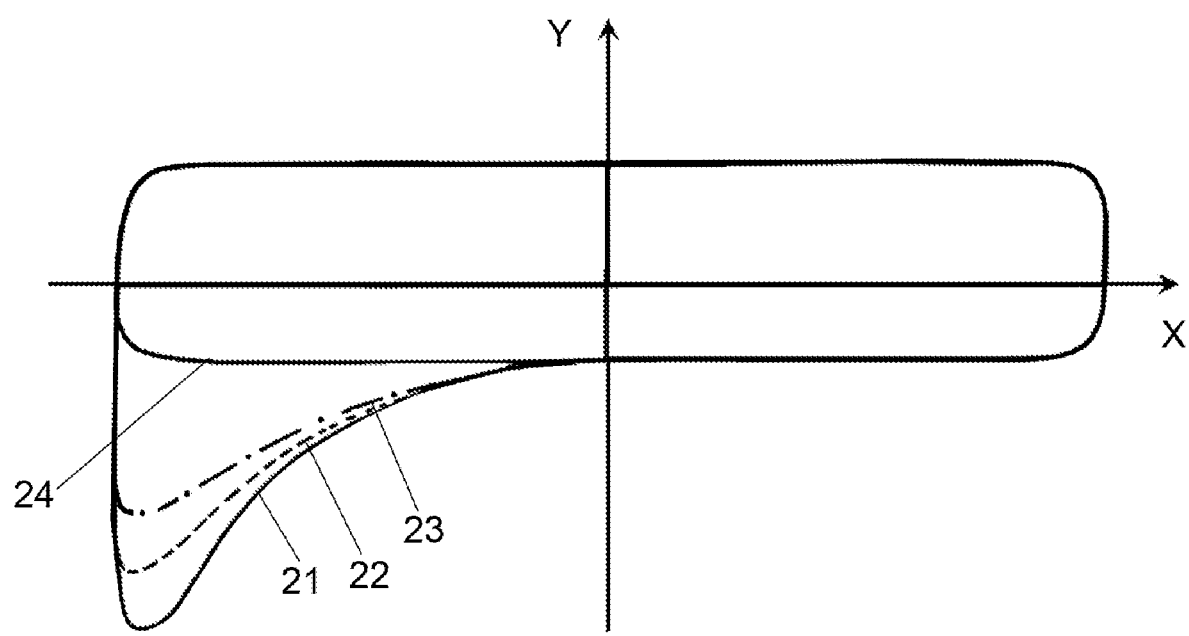
FIG. 14 represents a displacement force graph of the hydraulic device of the invention during a complete compression stroke according to the embodiment represented in FIGS. 9 to 11.

FIGS. 12, 13 and 14 show a graph wherein the ordinate axis represents the shock absorbing force and the abscissa axis represents the movement of the piston (15) of a shock absorber along a stroke. In addition to the curves for loaded (21), half loaded (22) and unloaded (23) vehicles for the hydraulic control device of the present invention, the curve that a standard shock absorber (24) follows is also represented.

The operating mode of the shock absorber in this first embodiment is represented in the force-movement graph of FIG. 12, wherein it can be seen that for a given movement, in the curve for a loaded vehicle (21), the force is smaller with respect to the curve for half-loaded vehicles (22) and this with respect to unloaded vehicles (23), reaching the same level at the end of the compression stroke regardless of the vehicle load. The maximum shock absorbing force in this embodiment is the same for all three load situations (21, 22, 23). This is due to the fact that, in an initial phase with the vehicle loaded, the variable leak opening (7) is open and, as the end of the compression stroke approaches, the variable leak opening (7) closes, due to the complete overlap of the upper tubular head (10) on the control surface (6), which prevents the access of fluid to the variable leak opening (7), behaving like the unloaded vehicle situation.

The position of the variable leak opening (7), the stiffness ratio of the upper (3) and lower (4) springs and the pre-deformation of the lower spring (4), which determine the ratio between the shock absorber stroke and the movement of the floating piston (1), they are all configurable and adaptable to the needs of the vehicle. This enables the vehicle load level from which the change of modes begins and for which the transition between hard and soft mode ends to be configured.

Figure 7:
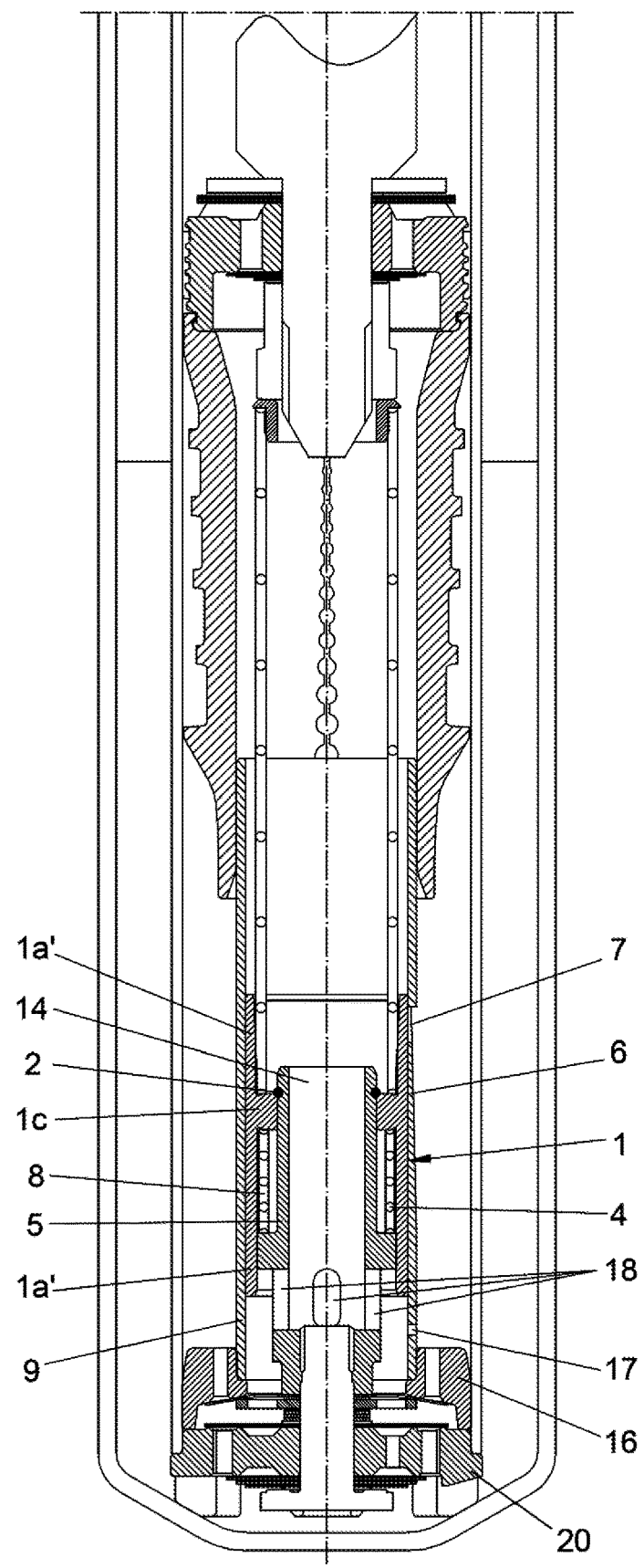
FIG. 7 represents the hydraulic device of the invention in a second embodiment for a vehicle unloaded and configured for hard mode positioned in an intermediate area of the compression stroke with the variable leak opening completely closed and the permanent leak opening open.
Figure 8:
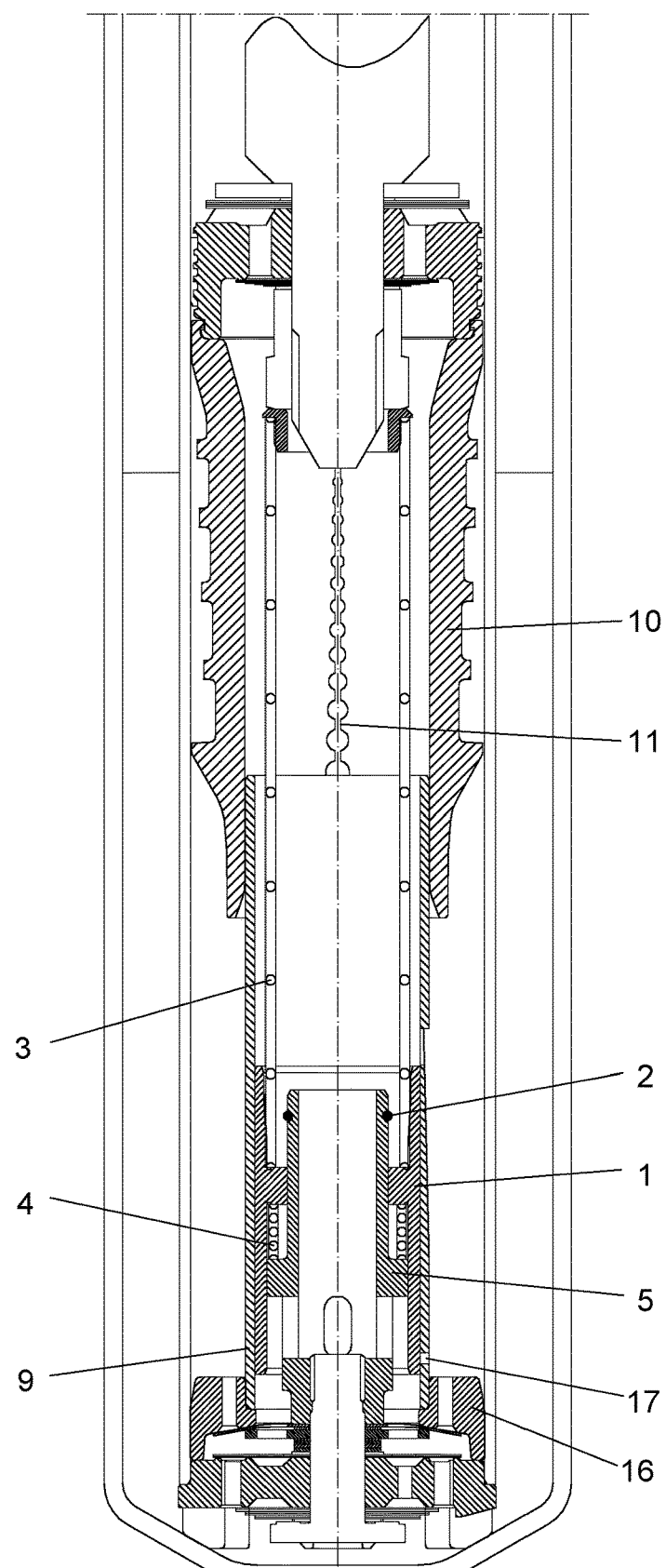
FIG. 8 represents the hydraulic device of FIG. 7 for a vehicle loaded and configured for soft mode, positioned in an intermediate area of the compression stroke, with the variable leak opening fully open and the permanent leak opening closed.

FIGS. 7 and 8 represent a second embodiment of the device of the invention wherein the inner tube (9), the floating piston (1) and the inner casing (5) are modified with respect to the first embodiment.

The inner tube (9), in addition to the variable leak opening (7), further incorporates a permanent leak opening (17) in a lower area, close to the annular support (16), although of a smaller size than the variable leak opening (7) and without a control surface (6) like the one in the variable leak opening (7).

Moreover, the smaller cylinder (1*b*) has been replaced in the floating piston (1) by an extended cylinder (1*a*') of the larger cylinder (1*a*), having the same diameter. Thus, the floating piston (1) is configured by the extended cylinder (1*a*') from which, at an intermediate height, the projection (1*c*) of the inner diameter protrudes. The extended cylinder (1*a*') is configured to slide along the inner surface of the inner tube (9) and the projection (1*c*) extends until contacting the outer surface of the hollow cylinder of the inner casing (5). In this second embodiment, the base of the inner casing (5) contacts the internal surface of the floating piston (1), so that the floating piston (1) slides on it, the inner casing (5) being fixed to the inner tube (9) by means of a valve support (20), as the floating piston (1), in this embodiment, must be able to slide along the inner tube (9) to be able to close the variable leak opening (7), located above the inner casing (5), and also to be able to close the permanent leak opening (17), located near the annular support (16), depending on the load situation of the vehicle. To allow the fluid to flow freely inside the internal chamber (14), the inner casing (5) incorporates through slots (18) in the area closest to the valve support (20), so that the fluid can flow through the internal chamber (14) until it reaches the valve support (20).

FIG. 7 represents a situation of the shock absorber in an unloaded vehicle, the variable leak opening (7) being completely closed and the permanent leak opening (17) being completely open, which provides it with a softer shock absorbing sensation as the fluid, in addition to flowing from the external chamber (13) to the internal chamber (14) through the channel (11), can also do so through the permanent leak opening (17), which is open.

Moreover, FIG. 8 represents a situation of the shock absorber in a loaded vehicle in a position of the floating piston (1) that enables the variable leak opening (7) to be completely open and the permanent leak opening (17) to be completely closed.

Figure 6:
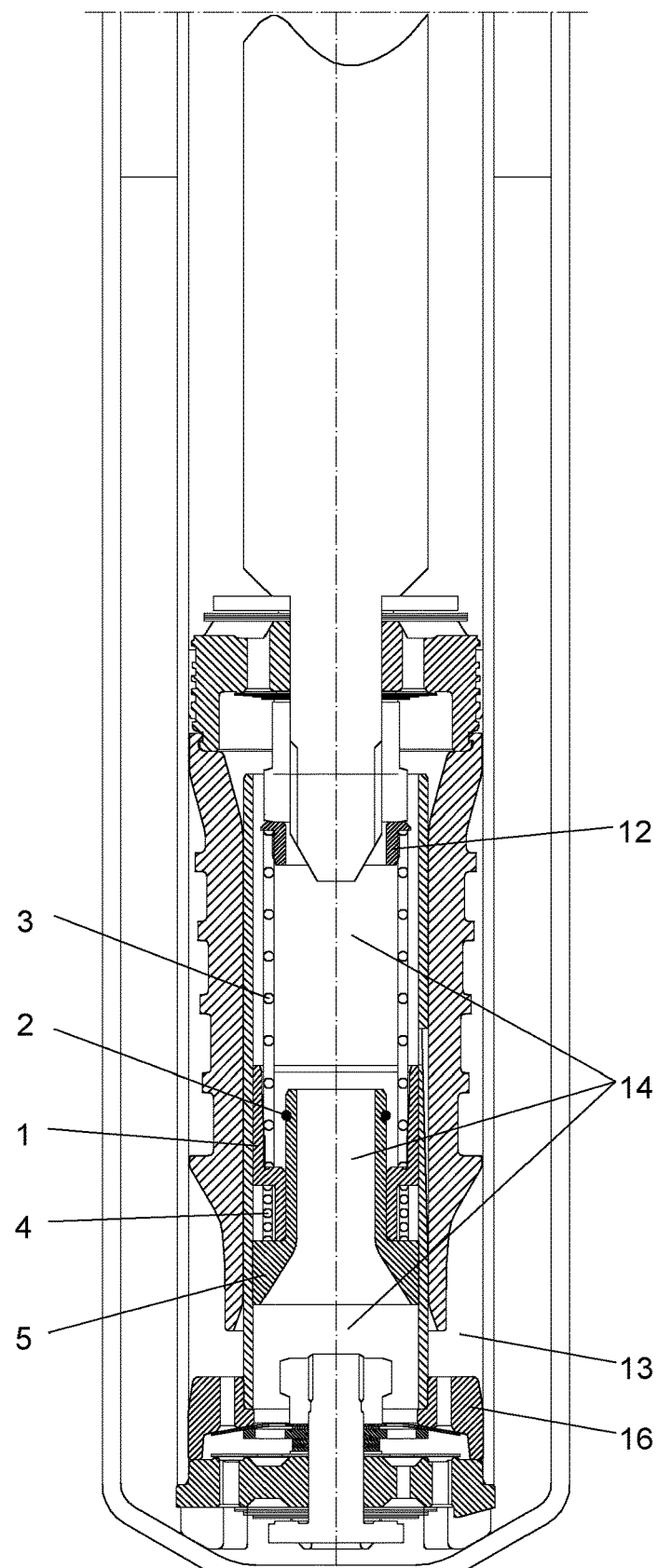
FIG. 6 represents the hydraulic device of FIG. 1 for a vehicle loaded and configured for soft mode, positioned at the end of the compression stroke, with the variable leak opening completely closed.

In this second embodiment, when the vehicle is loaded, in the compression movement, the variable leak opening (7) can be closed by the upper tubular head (10), as soon as the upper tubular head (10) is in a position as shown in FIG. 6 for the first embodiment.

Now, when the vehicle is unloaded and therefore the variable leak opening (7) is closed while the permanent leak opening (17) is open, in the compression movement, the permanent leak opening (17) will not be closed by the upper tubular head (10), as the movement of the upper tubular head (10) does not reach, in any phase of the compression stroke, the position wherein the permanent leak opening (17) is located.

Thus, when the vehicle is loaded, the floating piston (1) moves, opening the variable leak opening (7) and closing the permanent leak opening (17). Thus, the shock absorbing force is reduced and, as the end of the compression stroke approaches, the shock absorbing force is increased as the variable leak opening (7) closes.

However, in this embodiment, when the vehicle is unloaded, the variable leak opening (7) is closed but the permanent opening slot (17) is open and will not be closed by the upper tubular head (10). Therefore, the maximum shock absorbing force when the vehicle is unloaded is going to be reduced with respect to the loaded vehicle situation.

The function of the shock absorber is to have the ability to dissipate the kinetic energy to which it is subjected, counteracting it with a shock absorbing force so that, the higher the energy, the greater the force. Thus, in this embodiment, the shock absorbing force is optimized.

The energy is the area between the curves represented in the graphs and the X-axis of the piston (15) movement.

In this second embodiment, it is achieved that the energy dissipated by the device with the loaded vehicle is the same as the energy dissipated by the device with the unloaded vehicle.

In the first embodiment, the energy dissipated with the loaded vehicle will always be less than the energy dissipated with the unloaded vehicle. However, in this second embodiment, the adaptation ability to compensate for this is increased, both dissipated energies matching.

The operating mode of the shock absorber in this embodiment is represented in FIG. 13, wherein the movement force graph shows that, for a given displacement, in the curve for a loaded vehicle (21), the force is less than with respect to the curve for half-loaded vehicles (22) and this with respect to unloaded vehicles (23) until a moment arrives in the compression stroke in which the value of the force is reversed, increasing when the vehicle is loaded compared to when the vehicle is unloaded.

This is due to the fact that, with the vehicle unloaded, the permanent leak opening (17) remains open and the variable leak opening (7) remains closed; with the half-loaded vehicle, the variable leak opening (7) is partially open and the permanent leak opening (17) is partially closed; and finally, with the loaded vehicle, the variable leak opening (7) remains fully open, the permanent leak opening (17) being closed.

Now, the variable leak opening (7) has a larger cross section than the permanent leak opening (17), so that the passage of fluid from the external chamber (13) to the internal chamber (14) through the variable leak opening (7) is greater than the passage through the permanent leak opening (17), this causes the shock absorbing force in the case of a half-loaded and loaded vehicle to be less than when the vehicle is unloaded.

However, this situation is reversed as the compression stroke approaches the end thereof, wherein the upper tubular head (10) completely blocks the access of the fluid through the variable leak opening (7), which causes the shock absorbing force in the half-loaded and loaded vehicle to be higher than the shock absorbing force of the unloaded vehicle, since the latter continues to have a passage of fluid through the permanent leak opening (17).

Figure 9:
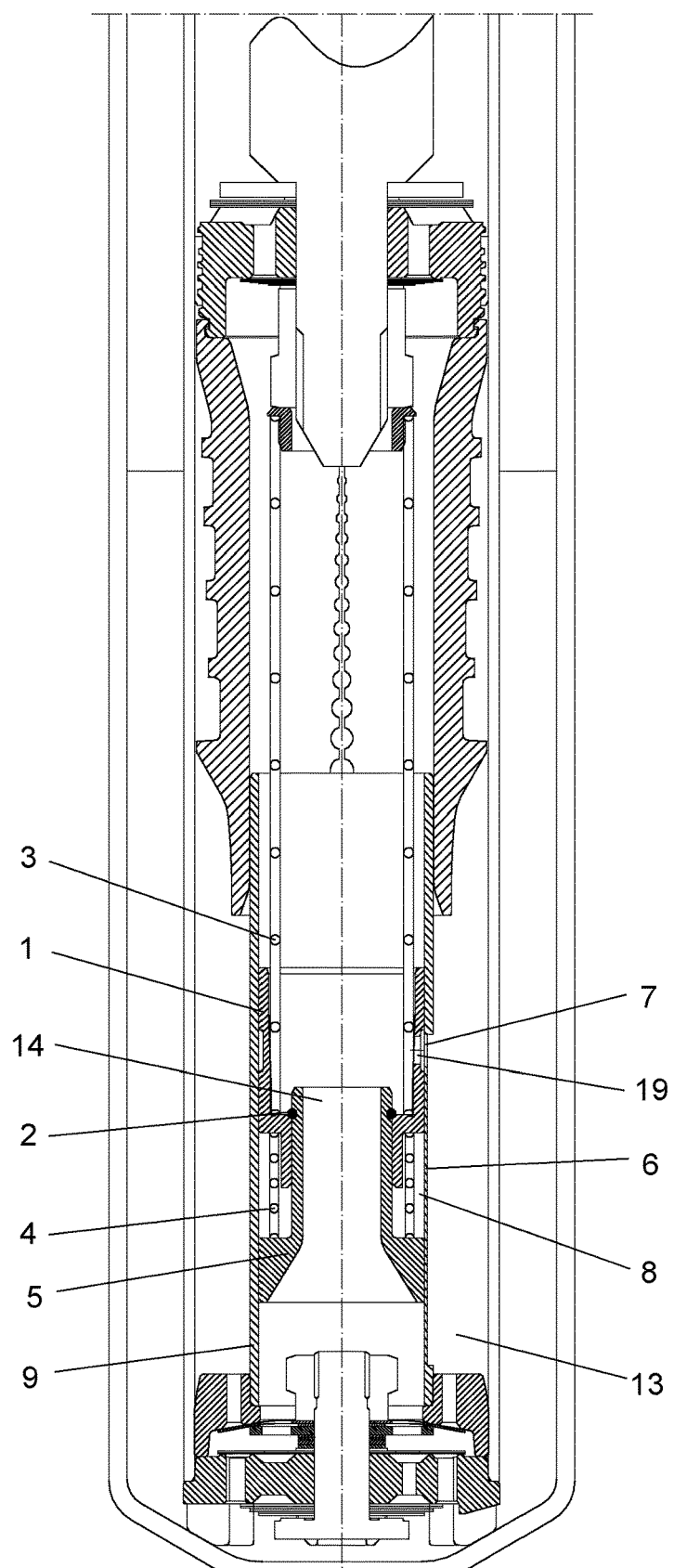
FIG. 9 represents the hydraulic device of the invention in a third embodiment for a vehicle unloaded and configured for soft mode, positioned in an intermediate area of the compression stroke, with the variable leak opening open as the through opening of the floating piston is in a position wherein it is facing it.
Figure 10:
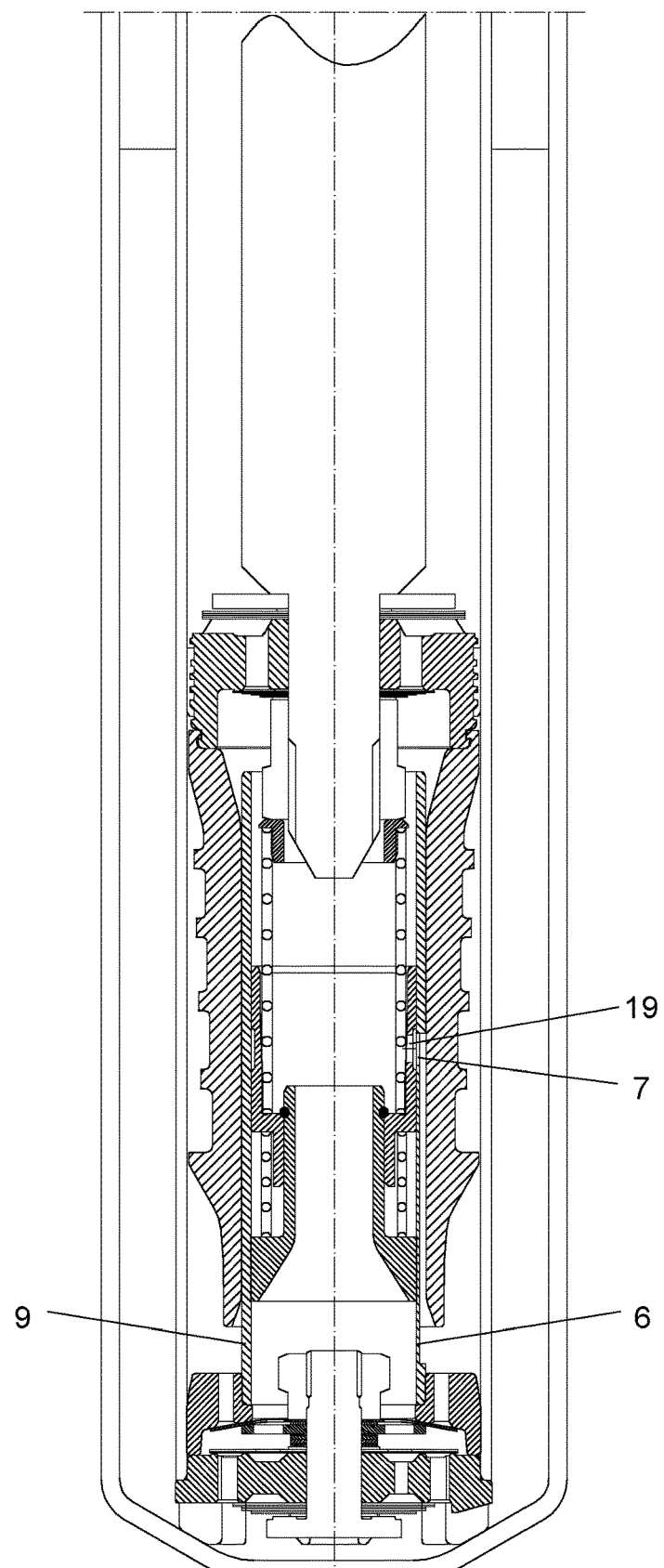
FIG. 10 represents the hydraulic device of FIG. 9 for a vehicle unloaded and configured for soft mode positioned at the end of the compression stroke, with the variable leak opening open, due to the fact that the upper tubular head does not close it and that the through opening of the floating piston is facing it.
Figure 11:
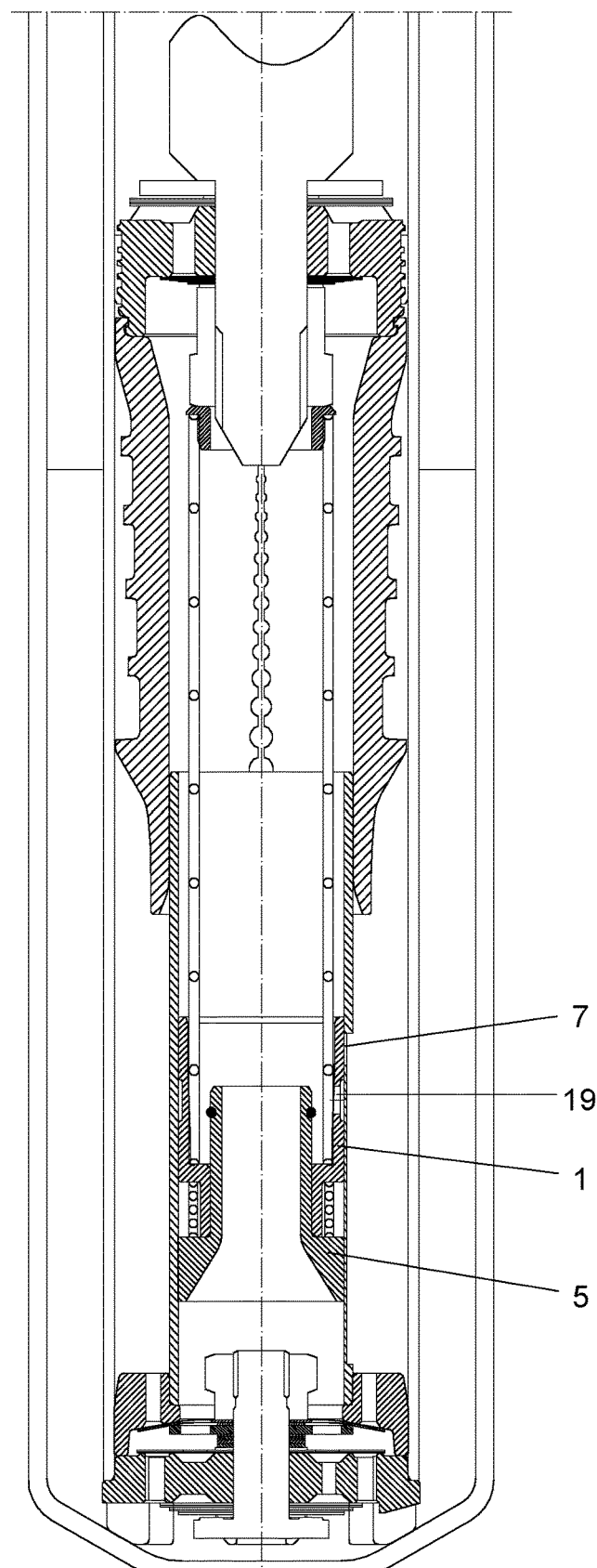
FIG. 11 represents the hydraulic device of FIG. 9 for a vehicle loaded and configured for hard mode positioned in an intermediate area of the compression stroke with the variable leak opening of the inner tube completely closed.

FIGS. 9 to 11 represent a third embodiment of the device of the invention wherein both the inner tube (9) and the floating piston (1) are modified with respect to the first embodiment.

As represented in FIGS. 9 to 11, the control surface (6) is modified. In this embodiment, the inner tube (9) does not have a variable configuration from less to more depth according to the longitudinal direction of the inner tube (9) until reaching the leak opening (7), as occurred in the two previous embodiments. Instead, in this third embodiment, a recess is made in the outer diameter of the inner tube (9) along a greater length of the inner tube (9), aimed at always leaving an opening with respect to the upper tubular head (10) preventing the passage from closing when the upper tubular head (10) reaches the end of the compression stroke, as represented in FIG. 10.

Thus, in this embodiment, the upper tubular head (10) never closes the access of the fluid from the external chamber (13) to the internal chamber (14) through the variable leak opening (7).

Moreover, the floating piston (1) incorporates a through opening (19) in an area that in certain positions is facing the variable leak opening (7).

FIGS. 9 and 10 represent this situation wherein, with the vehicle unloaded, the through opening (19) of the floating piston (1) faces the variable leak opening (7) of the inner tube (9), enabling the passage of fluid from the external chamber (13) to the internal chamber (14). This situation occurs throughout the entire compression movement since, as represented in FIG. 10, even when the upper tubular head (10) is in the end of the compression stroke position thereof, the variable leak opening (7) never closes it due to the recess carried out to the inner tube (9).

However, as represented in FIG. 11, when the vehicle is loaded, the piston (15) compresses the upper spring (3) and the floating piston (1), which presses the lower spring (4) and the through opening (19) is no longer facing the variable leak opening (7), the device being in the same operating mode of the HCS and hardening the suspension.

The mode of operation of the shock absorber in this third embodiment is represented in FIG. 14 wherein the force-movement graph of the shock absorber shows that, in the curve for a loaded vehicle (21), the force increases with the compression stroke and it is always higher than that of the curve for half-loaded vehicles (22) and that of unloaded vehicles (23).

By means of this embodiment, the shock absorbing force is further optimized, reducing it when the vehicle is unloaded and increasing it in half-loaded or loaded vehicle situations.

As indicated above, the function of the shock absorber is to have the ability to dissipate the kinetic energy to which it is subjected, counteracting it with a shock absorbing force so that, the higher the energy, the greater the force.

When a vehicle is unloaded, it has the full length of the compression stroke to be able to dissipate the energy, while when the vehicle is loaded, this compression length is reduced.

The energy is the area between the curves represented in the graphs and the X-axis of the piston (15) movement. In this third embodiment, when the vehicle is unloaded, it is not necessary to apply a high shock absorbing force since, by having the entire compression length to dissipate the energy, this force can be reduced. However, when the vehicle is loaded, the force must be adapted to the energy to be dissipated depending on how much length of the compression stroke is left for the shock absorber once it has been loaded. For this reason, when the vehicle is loaded it is convenient that the force is increased in the last section of the compression stroke.

Depending on the vehicle or the application for which the device of the invention is intended, the embodiment that best suits the requirements to which it will be subjected will be chosen.

Thus, in the case of being applied in vehicles, the first embodiment would be used in utility vehicles wherein an average suspension is needed, the second embodiment would be applied in vehicles where comfort prevails, for example family vehicles, since this embodiment would provide a softer suspension as it depends a lot on the HCS and finally, the third embodiment would be intended for vehicles wherein a hard suspension is of interest, such as sports cars, wherein there is little dependence on the HCS function.

Lastly, it must be taken into account that the present invention must not be limited by the embodiment described herein. Other configurations may be carried out by those skilled in the art based on the present description. Accordingly, the scope of the invention is defined by the following claims.

The invention claimed is:

1. A variable load hydraulic control device which comprises a piston, activated by means of a rod, which slides through a tubular casing, differentiating a traction chamber from a compression chamber wherein, fixed to the piston, an upper tubular head is housed which comprises a longitudinal channel open at least at one end, and an inner tube fixed to an annular support which comprises a series of through holes, wherein the upper tubular head is configured to slide through a tubular casing and an outside of the inner tube, forming an internal chamber and an external chamber, inner and outer to the inner tube and the upper tubular head respectively, wherein both the internal chamber and the external chamber communicate through the channel and the through holes of the annular support, wherein the device comprises:

an inner casing, coaxial and enabling a space with the inner tube, to which it is fixed, a floating piston, fitted in the space between the inner tube and the inner casing, between which it is able to slide, and coaxial to them, a retaining ring located in the inner casing, an upper spring, coaxial with the inner tube and located between a projection of the floating piston and an extension of a washer located inside the upper tubular head, a lower spring, coaxial to the inner tube and located in a control chamber that is generated between the projection of the floating piston and a base located in the inner casing, a control surface configured by means of a recess of the outer surface of the inner tube, which comprises a variable leak opening for communication of the external chamber and the internal chamber, wherein the position of the floating piston is determined by a static load of a hydraulic control device and determines a passage cross section of the variable leak opening.

2. The variable load hydraulic control device, according to claim 1, wherein the control chamber is configured by the projection of the floating piston, by a base of the inner casing, by an inner surface of an element to be selected between the inner tube and the floating piston and by an outer surface of an element to be selected between the floating piston and the inner casing, and it is further filled with fluid, so that the floating piston does not move as it is subjected to dynamic loads.

3. The variable load hydraulic control device, according to claim 1, wherein the control surface has a variable depth with respect to an outer diameter of the inner tube increasing in the direction of a longitudinal axis of the inner tube until reaching the variable leak opening and a length such that it is covered by the upper tubular head during the compression stroke.

4. The variable load hydraulic control device, according to claim 1, wherein:

the inner tube comprises a permanent leak opening in a position close to the annular support inaccessible by the upper tubular head, and the inner casing is attached to the inner tube by a valve support and comprises through slots so that the fluid can circulate inside the internal chamber.

5. The variable load hydraulic control device, according to claim 1, wherein the control surface has a depth with respect to the outer diameter of the inner tube and has a length that always protrudes from the upper tubular head during the compression stroke, preventing the passage of fluid from closing when the upper tubular head reaches the end of the compression stroke.

6. The variable load hydraulic control device, according to claim 5, wherein the floating piston comprises a through opening in a position such that, depending on the static load to which it is subjected, it faces the leak opening, enabling the fluid to flow between the external chamber and the internal chamber.

7. The variable load hydraulic control device, according to claim 1, wherein the upper tubular head comprises a plurality of holes aligned and centered on the channel.

8. The variable load hydraulic control device, according to claim 7, wherein the channel of the upper tubular head is closed at an end closest to the piston, so that the flexibility of the upper tubular head increases as the distance to that end increases.

9. The variable load hydraulic control device, according to claim 7, wherein the channel is a through channel, that is, the two ends of the channel of the upper tubular head are open.

* * * * *

UNITED STATES PATENT AND TRADEMARK OFFICE
CERTIFICATE OF CORRECTION

PATENT NO. : 11,592,073 B2
APPLICATION NO. : 17/117495
DATED : February 28, 2023
INVENTOR(S) : Javier Lizarraga Senar Page 1 of 1

It is certified that error appears in the above-identified patent and that said Letters Patent is hereby corrected as shown below:

On the Title Page

Column 1, Foreign Application Priority Data, Line 1, delete "ES201931098" and insert
-- P201931098 --

Signed and Sealed this
Twenty-seventh Day of June, 2023

Katherine Kelly Vidal
*Director of the United States Patent and Trademark Office*